United States Patent [19]
Rabby

[11] Patent Number: 5,806,563
[45] Date of Patent: Sep. 15, 1998

[54] DUAL BALL VALVE ASSEMBLY

[75] Inventor: Glen Irvin Rabby, Sherwood Park, Canada

[73] Assignee: Hi-Kalibre Equipment Ltd., Edmonton, Canada

[21] Appl. No.: 762,591

[22] Filed: Dec. 9, 1996

Related U.S. Application Data

[63] Continuation of Ser. No. 633,057, Apr. 16, 1996, Pat. No. 5,642,754.

[51] Int. Cl.⁶ .................................................... F16K 5/06
[52] U.S. Cl. .......................... 137/613; 251/316; 251/360
[58] Field of Search ....................... 137/613; 251/315.01, 251/360, 363, 359, 362, 316, 314

[56]  References Cited

U.S. PATENT DOCUMENTS

| | | | |
|---|---|---|---|
| 3,760,836 | 9/1973 | Albanese | 251/315.01 X |
| 5,404,905 | 4/1995 | Lauria | 137/613 X |
| 5,452,677 | 9/1995 | Kirkpatrick | 251/315.01 X |

FOREIGN PATENT DOCUMENTS

| | | | |
|---|---|---|---|
| 570353 | 12/1957 | Italy | 137/613 |
| 1809898 | 4/1993 | U.S.S.R. | 251/315.01 |

Primary Examiner—Kevin Lee
Attorney, Agent, or Firm—Anthony R. Lambert

[57]  ABSTRACT

A dual ball valve assembly which includes a one piece tubular valve housing having box connections at each of a first end a second end. A first ball valve is positioned between a first valve seat and a second valve seat at one end. A second ball valve is positioned between a third valve seat and a fourth valve seat at the other end.

3 Claims, 4 Drawing Sheets

DUAL BALL VALVE ASSEMBLY

This is application is a continuation of application Ser. No. 08/633,057 filed on the 16th day of Apr. 1996, U.S. Pat. No. 5,642,754.

FIELD OF THE INVENTION

The present invention relates to a dual ball valve assembly and, in particular, a dual ball valve assembly for use in the oil and gas industry.

BACKGROUND OF THE INVENTION

A ball valve generally consists of a ball having an aperture extending therethrough, a first valve seat member positioned on a first side of the ball having a first arcuate valve seat, and a second valve seat member positioned on a second side of the ball having a second arcuate valve seat. When the aperture of the ball is axially aligned with the conduit such the fluid can flow along the conduit through the aperture, the ball valve is said to be in an open position. When the ball is rotated to block the flow of fluid along the conduit, the ball valve is said to be in a closed position. The ball valve assembly includes a valve housing, and means for locking the first valve seat member and the second valve seat member within the valve housing. Ball valves used in the oil and gas industry must be adapted to connect to a string of tubing. In order to make this connection the valve housing is fabricated with a pin connection at one end and a box connection at the other end.

There are a number of applications in the oil and gas industry in which it is desirable to use dual ball valves. In such applications, two ball valves are connected together with the pin connection of one ball valve being coupled with the box connection of the other ball valve. Care must be taken in rotating the string of tubing or the connection between the two ball valves will come undone.

SUMMARY OF THE INVENTION

What is required is a dual ball valve assembly that will not separate into two sections during use.

According to the present invention there is provided a dual ball valve assembly which includes a one piece tubular valve housing having box connections at each of a first end a second end. A first ball valve is positioned between a first valve seat and a second valve seat at one end. A second ball valve is positioned between a third valve seat and a fourth valve seat at the other end.

With the dual ball valve assembly, as described above, assembly within a one piece tubular valve housing is made possible by having box connections at each end.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
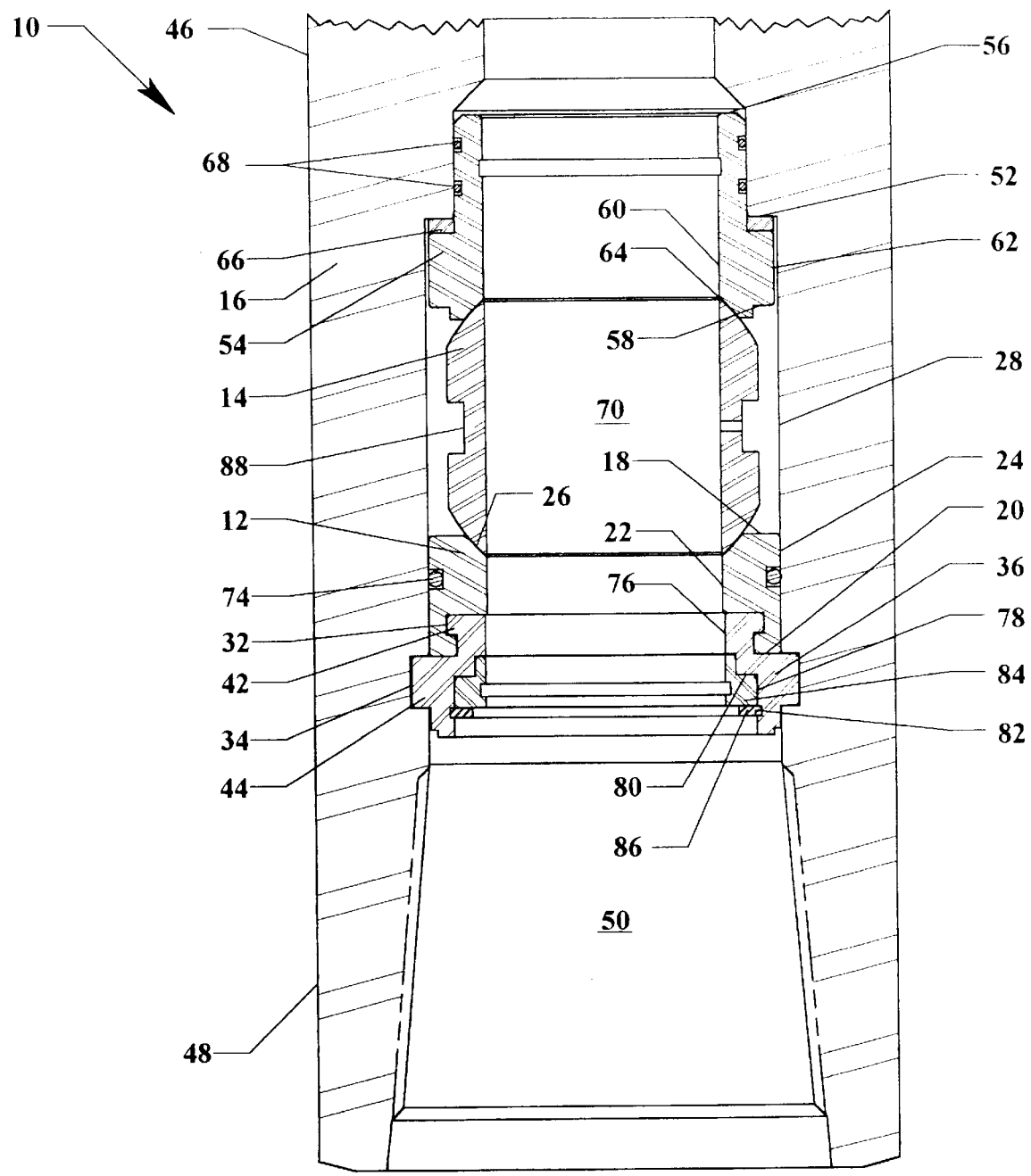
FIG. 1 is a side elevation view in section of a single ball valve assembly constructed in accordance with the teachings of the present invention.
Figure 2:
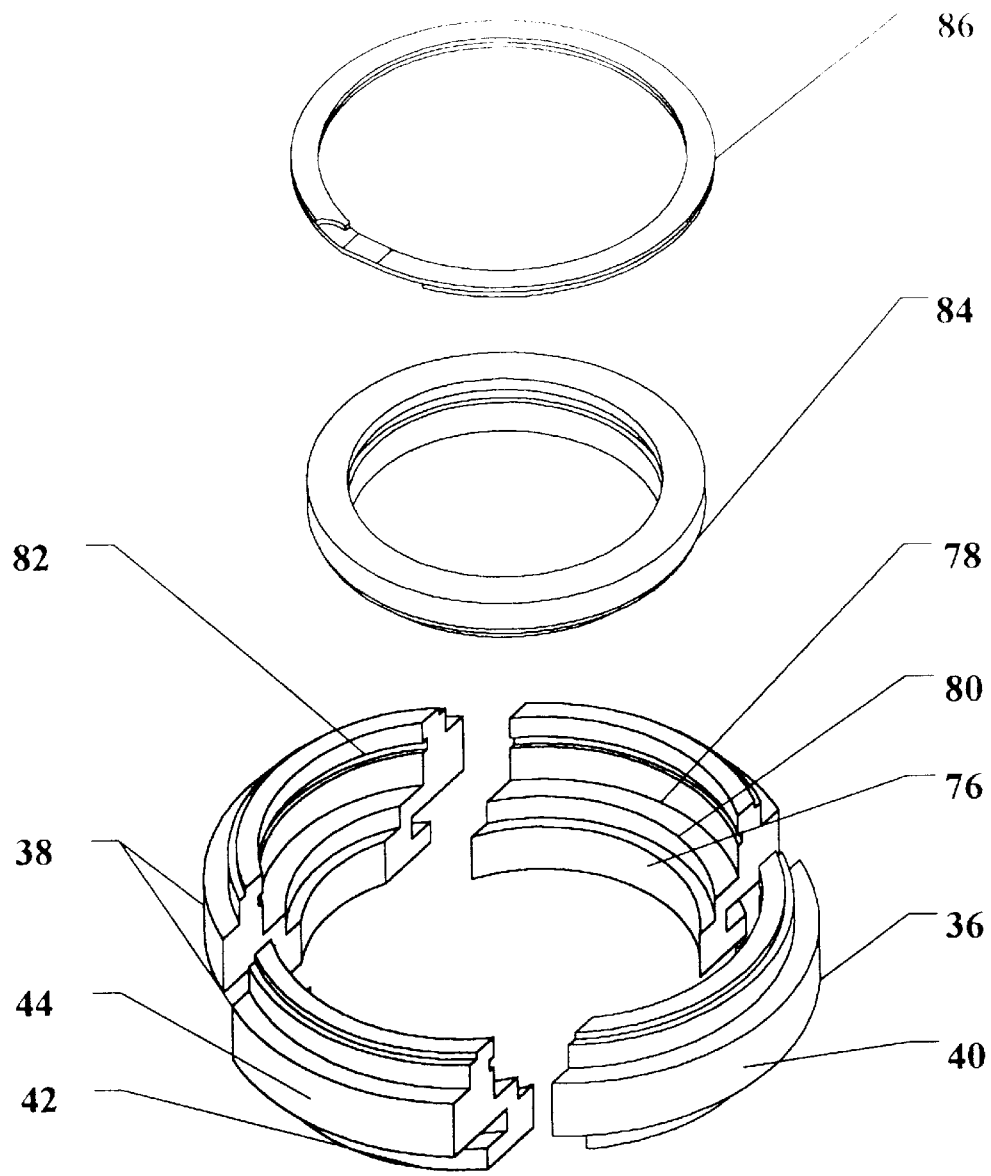
FIG. 2 is an exploded perspective view of a portion of the single ball valve assembly illustrated in FIG. 1.
Figure 2:
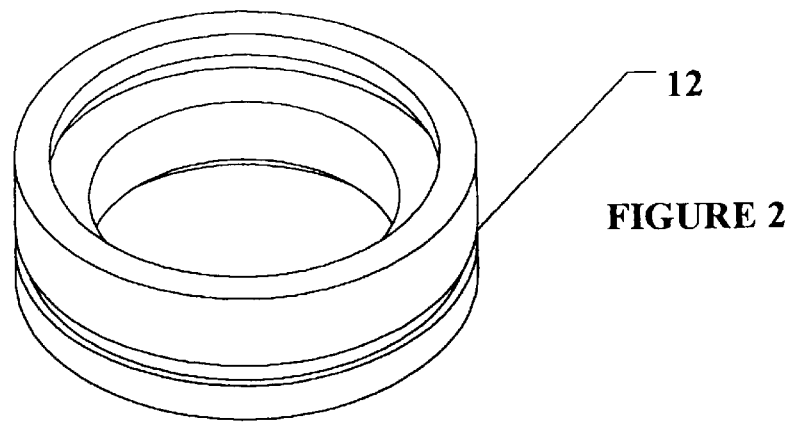
Figure 3:
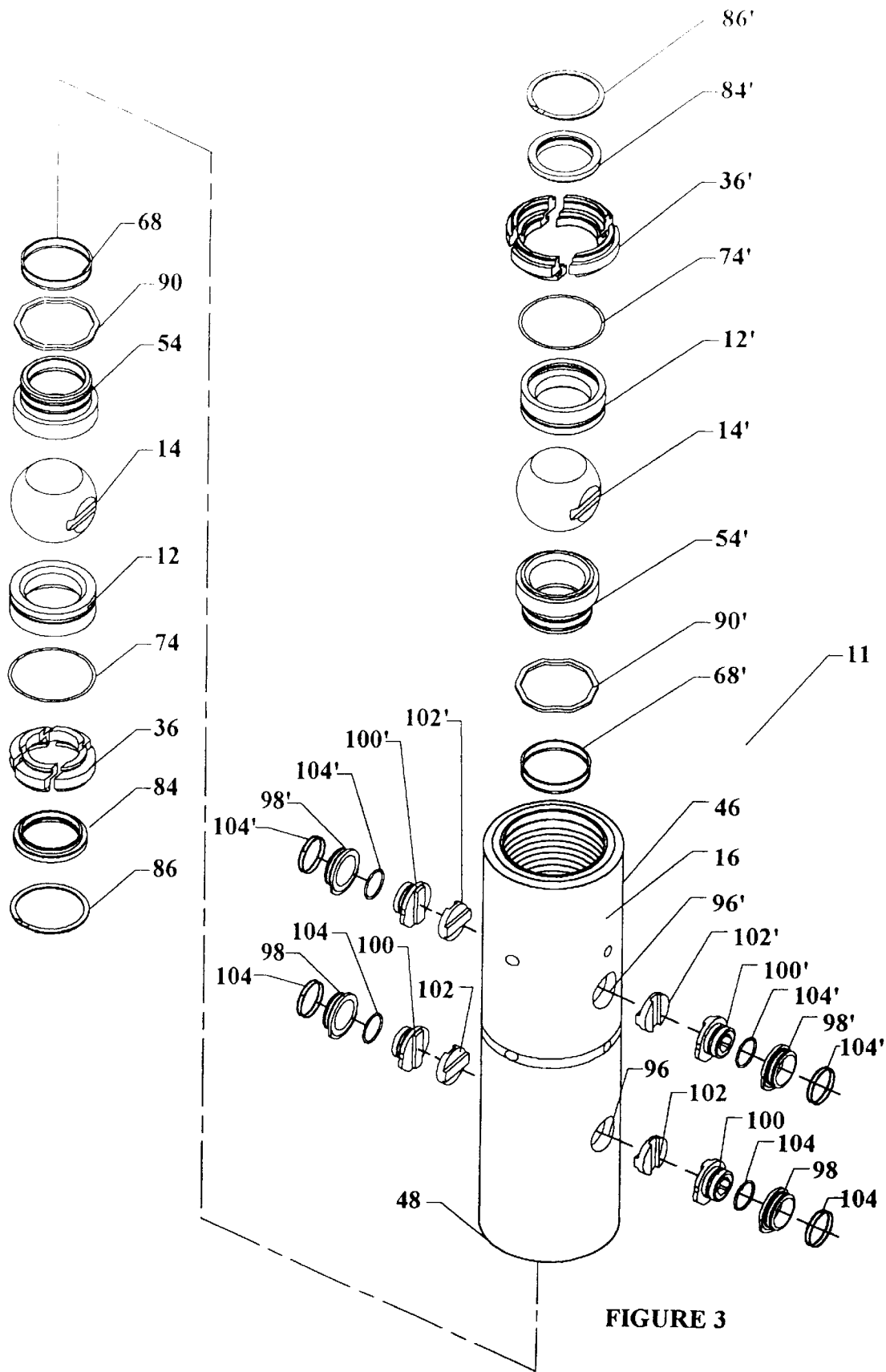
FIG. 3 is an exploded perspective view of a dual ball valve assembly constructed in accordance with the teachings of the present invention.
Figure 4:
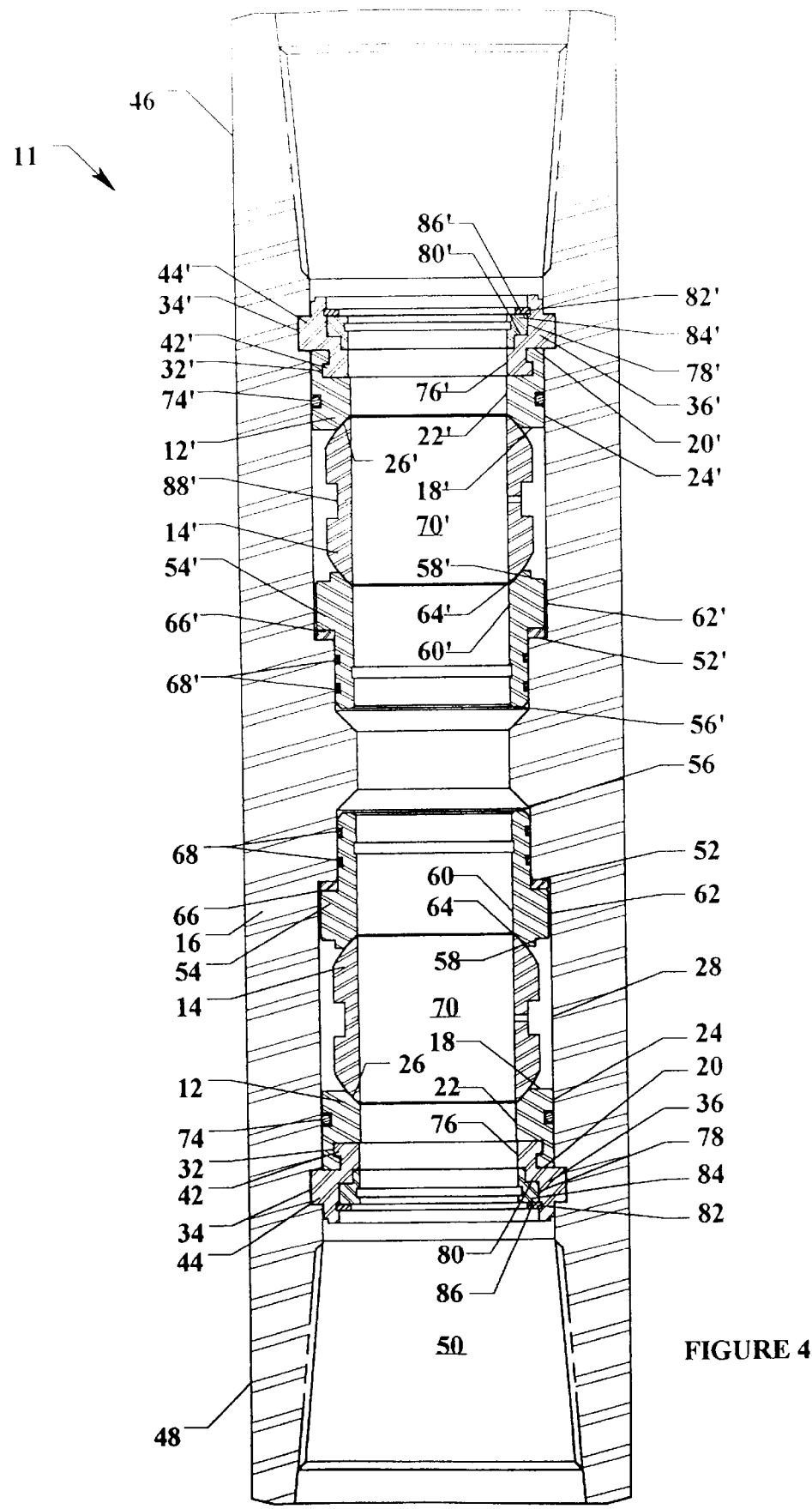
FIG. 4 is a side elevation view in section of the dual ball valve assembly illustrated in FIG. 3.

A preferred valve seat member for a ball valve within a tubular housing will now be described with reference to a single ball valve assembly and a dual ball valve assembly generally identified by reference numerals 10 and 11, as illustrated in FIGS. 1 through 4. Single ball valve assembly 10 is illustrated in FIG. 1 and 2. Dual ball valve assembly is illustrated in FIGS. 3 and 4.

Referring to FIG. 1, there is illustrated an annular valve seat member 12, a ball 14, and a tubular housing 16. The preferred method of securing valve seat member 12 within tubular housing 16 consists of the following steps. Firstly, provide annular valve seat member 12 and tubular valve housing 16. Annular valve seat member 12 has a first face 18, a second face 20, an interior surface 22 and an exterior surface 24. One of first face 18 and second face 20 of annular valve seat member 12 has an arcuate valve seat 26. In the illustrated embodiment arcuate valve seat 26 is positioned on first face 18. Tubular valve housing 16 has an interior surface 28. Secondly, position female mating means (here illustrated in the form of an annular groove 32) in interior surface 22 of annular valve seat member 12 and female mating means (here illustrated in the form of an annular groove 34) in interior surface 28 of tubular valve housing 16. Thirdly, locking annular valve seat member 12 to interior surface 28 of tubular valve housing 16 with a split ring 36. It will be noted from a review of FIG. 2, that split ring 36 consists of a plurality of arcuate segments individually identified by reference numeral 38. Referring to FIG. 1, split ring 36 has an exterior surface 40 with first male mating means (here illustrated in the form of an annular tongue or rib 42) that engage the female mating means (annular groove 32) of annular valve seat member 12 and second male mating means (here illustrated in the form of an annular tongue or rib 44) that engages the second female mating means (annular groove 34) in interior surface 28 of tubular valve housing 16.

Referring to FIG. 1, single ball valve assembly 10 will now be described in greater detail. In addition to the details already described, tubular valve housing 16 has a first end 46 and a second end 48. Interior surface 28 defines an interior bore 50. An annular shoulder 52 projects from interior surface 28 into interior bore 50. Annular groove 34 in interior surface 28 are spaced from shoulder 52. There are, of course, two valve seat members that engage ball 14. Valve seat member 12, already identified is a second valve seat member. A first valve seat member 54 is provided that has a first face 56, a second face 58, an interior surface 60 and an exterior surface 62. Second face 58 has a first arcuate valve seat 64. First valve seat member 54 is disposed within interior bore 50 of tubular valve housing 16. A shoulder 66 on exterior surface 62 of first valve seat member 54 engages shoulder 52 that projects from interior surface 28 of tubular valve housing 16 thereby precluding movement of first valve seat member 54 along interior bore 50 in a first axial direction toward first end 46 of tubular valve housing 16. First valve seat member 54 has a pair of annular seals 68 that sealingly engage interior surface 28 of tubular valve housing 16. First arcuate valve seat 64 is oriented toward second end 48 of tubular valve housing 16. Ball 14 has an aperture 70 extending therethrough. Ball 14 engages first arcuate valve seat 64. An annular seal 74 is positioned on exterior surface 24 of first valve seat member 12. First face 18 of second valve seat member 12 has second arcuate valve seat 26. In addition to exterior surface 40, split ring 36 has an interior surface 76. Interior surface 76 has an enlarged diameter portion 78. A shoulder 80 is formed where enlarged diameter portion 78 of interior surface 76 terminates. An annular groove 82 is positioned in enlarged diameter portion 78 spaced from shoulder 80. An annular locking ring 84 is positioned in enlarged diameter portion 78. Annular locking ring 84 serves as means for locking split ring 36 in position as it engages interior surface 76 of split ring 36 to prevent removal of individual arcuate segments 38. A spiral wound retaining ring 86 is positioned in annular groove 82 in enlarged diameter portion 78 to prevent removal of locking ring 84. Ball 14 has an opening 88 that is part of the means used for rotating ball 14. Opening 88 is indirectly coupled to a male actuator member from a valve actuator (not shown) as will be hereinafter further described.

Referring to FIGS. 3 and 4, dual ball valve assembly 11 represents the best mode of putting the teaching of the present method into effect. It is constructed by placing two embodiments of single ball valve assembly 10 back to back in a single tubular housing. One of the two back to back single ball valve assemblies 10 will be identified in FIGS. 3 and 4 by the same reference numerals used in FIGS. 1 and 2; the other of the single ball valve assemblies 10 will be identified by reference numerals followed by ', ie. 10'. Referring to FIG. 4, tubular valve housing 16 is provided with two shoulders and two annular grooves. For the purpose of the description which follows shoulder 52 has been designated as second shoulder 52. Second shoulder 52 projects from interior surface 28 into interior bore 50 spaced from second end 48. In addition to second shoulder 52, a first shoulder 52' is provided that projects from interior surface 28 into interior bore 50 spaced from first end 46. For the purpose of the description, annular groove 34 has been designated as second annular groove 34. Second annular groove 34 is positioned in interior surface 28 spaced from second shoulder 52 toward second end 48 of tubular valve housing 16. In addition to second annular groove 34, a first annular groove 34' is provided in interior surface 28 spaced from first shoulder 52' toward first end 46. A third valve seat member 54' is provided having a first face 56', a second face 58', an interior surface 60' and an exterior surface 62'. Second face 58' has a third arcuate valve seat 64'. Third valve seat member 54' is disposed within interior bore 50. A shoulder 66' on exterior surface 62' of third valve seat member 54' engages first shoulder 52' projecting from interior surface 28 of tubular valve housing 16, thereby precluding movement of third valve seat member 54' along interior bore 50 in a second axial direction toward second end 48 of tubular valve housing 16. Third arcuate valve seat 64' is oriented toward first end 46 of tubular valve housing 16. A second ball 14' is provided having an aperture 70' extending therethrough. Second ball 14' engages third arcuate valve seat 64'. A fourth valve seat member 12' is provided having a first face 18', a second face 20', an interior surface 22' and an exterior surface 24'. First face 18' of fourth valve seat member 12' has a fourth arcuate valve seat 26'. Interior surface 22' of fourth valve seat member 12' has an annular groove 32'. A second split ring 36' is provided having an interior surface 76' and an exterior surface 40'. Exterior surface 40' has a first annular tongue 42' that engages annular groove 32' of fourth valve seat member 12' and a second annular tongue 44' that engage annular groove 34' in interior surface 28 of tubular valve housing 14. Interior surface 76' has an enlarged diameter portion 78'. A shoulder 80' is formed where enlarged diameter portion 78' of interior surface 76' terminates. An annular groove 82' is positioned in enlarged diameter portion 78' spaced from shoulder 80'. An annular locking ring 84' is positioned in enlarged diameter portion 78'. Annular locking ring 84' serves as means for locking split ring 36' in position as it engages interior surface 76' of split ring 36' to prevent removal of individual arcuate segments 38'. A spiral wound retaining ring 86' is positioned in annular groove 82' in enlarged diameter portion 78' to prevent removal of locking ring 84'. Ball 14' has an opening 88' that is part of the means used for rotating ball 14'. There are some components illustrated in FIG. 3 that have not been previously described. Wave springs 90 and 90' are disposed between valve seat members 54 and 54', respectively, and shoulders 52 and 52'. Tubular valve housing 16 has apertures 96 and 96' extending therethrough to receive male valve actuators (not shown). The components that connect with the male valve actuators include a female stem insert 98 and 98', a slave stem connector 100 and 100', and a U-joint connector 102 and 102'. U-joint connector 102 engages opening 88 in ball valve 14. When a male actuator member (not shown) is inserted into female stem insert 98, an indirect coupling of the male actuator member and ball valve 14 is achieved. In addition, there are O ring seals 104 and 104' disposed between those components.

Referring to FIG. 3, dual ball valve assembly 11 is so constructed that the only point of entry for first ball 14 and second ball 14' into interior bore 50 is through first end 46 and second end 48, respectively.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A dual ball valve assembly, comprising:
   a one piece tubular valve housing having a first end, a second end, an interior surface defining an interior bore, a first shoulder that projects from the interior surface into the interior bore spaced from the first end, a second shoulder that projects from the interior surface into the interior bore spaced from the second end, the one piece tubular valve housing having box connections at each of the first end and the second end, the only points of entry for a ball valve being through the interior bore at the first end and the second end of the tubular valve housing;
   a first valve seat member having a first face, a second face, an interior surface and an exterior surface, the second face having a first arcuate valve seat, the first valve seat member being disposed within the interior bore and engaging the second shoulder projecting from the interior surface of the tubular valve housing thereby precluding movement of the first valve seat member along the interior bore in a first axial direction toward the first end of the tubular valve housing, the first arcuate valve seat being oriented toward the second end of the tubular valve housing;
   a first ball having an aperture extending therethrough engaging the first arcuate valve seat;
   a second valve seat member having a first face, a second face, an interior surface and an exterior surface, the first face of the second valve seat member having a second arcuate valve seat;
   means for maintaining the second arcuate valve seat in contact with the first ball;
   a third valve seat member having a first face, a second face, an interior surface and an exterior surface, the second face having a third arcuate valve seat, the third valve seat member being disposed within the interior bore and engaging the first shoulder projecting from the interior surface of the tubular valve housing thereby precluding movement of the third valve seat member along the interior bore in a second axial direction toward the second end of the tubular valve housing, the third arcuate valve seat being oriented toward the first end of the tubular valve housing;

a second ball having an aperture extending therethrough engaging the third arcuate valve seat;

a fourth valve seat member having a first face, a second face, an interior surface and an exterior surface, the first face of the fourth valve seat member having a fourth arcuate valve seat;

means for maintaining the fourth arcuate valve seat in contact with the second ball.

2. A dual ball valve assembly, comprising:

a one piece tubular valve housing having a first end, a second end, an interior surface defining an interior bore, a first shoulder that projects from the interior surface into the interior bore spaced from the first end, a second shoulder that projects from the interior surface into the interior bore spaced from the second end, first female mating means in the interior surface spaced from the first shoulder toward the first end and second female mating means in the interior surface spaced from the second shoulder toward the second end, the only points of entry for a ball valve being through the interior bore at the first end and the second end of the tubular valve housing;

a first valve seat member having a first face, a second face, an interior surface and an exterior surface, the second face having a first arcuate valve seat, the first valve seat member being disposed within the interior bore and engaging the second shoulder projecting from the interior surface of the tubular valve housing thereby precluding movement of the first valve seat member along the interior bore in a first axial direction toward the first end of the tubular valve housing, the first arcuate valve seat being oriented toward the second end of the tubular valve housing;

a first ball having an aperture extending therethrough engaging the first arcuate valve seat;

a second valve seat member having a first face, a second face, an interior surface and an exterior surface, the first face of the second valve seat member having a second arcuate valve seat, the interior surface of the second valve seat member having female mating means;

a first split ring having an interior surface and an exterior surface, the exterior surface having first male mating means that engage the female mating means of the second valve seat member and second male mating means that engage the second female mating means in the interior surface of the tubular valve housing;

means for locking the first split ring in position; and means for rotating the first ball;

a third valve seat member having a first face, a second face, an interior surface and an exterior surface, the second face having a third arcuate valve seat, the third valve seat member being disposed within the interior bore and engaging the first shoulder projecting from the interior surface of the tubular valve housing thereby precluding movement of the third valve seat member along the interior bore in a second axial direction toward the second end of the tubular valve housing, the third arcuate valve seat being oriented toward the first end of the tubular valve housing;

a second ball having an aperture extending therethrough engaging the third arcuate valve seat;

a fourth valve seat member having a first face, a second face, an interior surface and an exterior surface, the first face of the fourth valve seat member having a fourth arcuate valve seat, the interior surface of the fourth valve seat member having female mating means;

a second split ring having an interior surface and an exterior surface, the exterior surface having first male mating means that engage the female mating means of the fourth valve seat member and second male mating means that engage the first female mating means in the interior surface of the tubular valve housing;

means for locking the second split ring in position; and means for rotating the second ball.

3. A ball valve and seat assembly comprising:

a ball valve body having a first end, a second end, and a hollow bore, the only points of entry for a ball valve being through the hollow bore at the first end and the second end of the ball valve body;

a ball valve rotatably mounted within the hollow bore;

first and second valve seats disposed within the valve body on opposed sides of the ball valve, the ball valve being rotatably seated on the valve seats;

the first valve seat being secured against movement in a first axial direction along the bore of the valve body;

the second valve seat including an interior annular groove;

a valve body annular groove in the valve body adjacent the second valve seat; and a split ring having first and second annular ribs, the first annular rib mating with the interior annular groove and the second annular rib mating with the valve body annular groove.

* * * * *